Patented Feb. 27, 1951

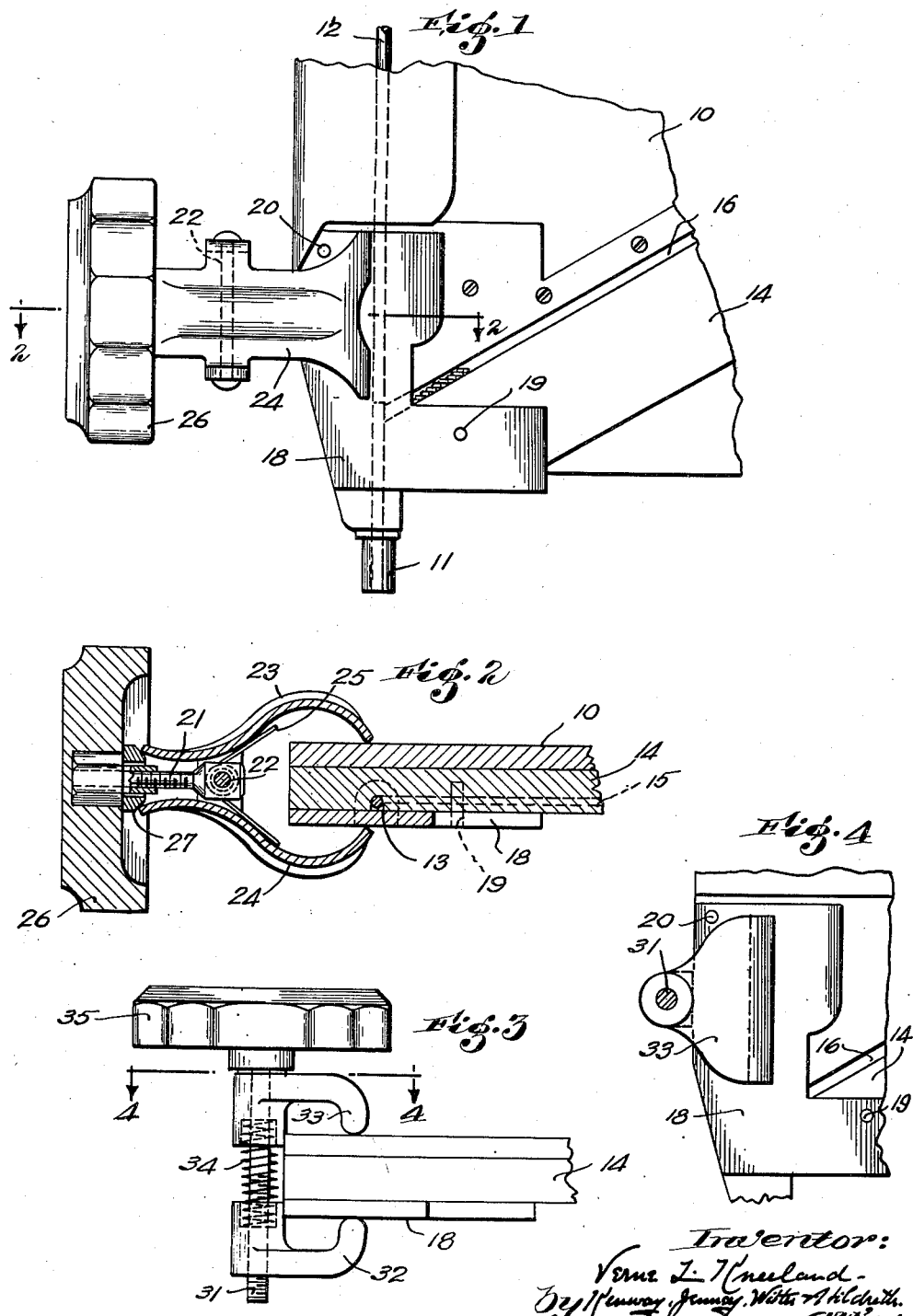

2,543,550

UNITED STATES PATENT OFFICE 2,543,550

FASTENER SETTING MACHINE

Verne L. Kneeland, Manchester, N. H.

Application November 16, 1948, Serial No. 60,320

3 Claims. (Cl. 1—18)

This invention consists in a new and improved raceway for fastener setting machines in which fasteners such as tacks are delivered one by one in driving position in line with a power operated driver.

An important field of use of the invention is in its application to tacking machines such, for example, as insole tacking machines used in the shoemaking industry, and for purposes of illustration the invention will be described in that connection although it is not limited to that or to any specific type of fastener setting machine but is of general application to any such machine employing a raceway in which tacks, staples or the like are conducted one by one to a driver passage or nozzle. In operation under factory conditions the tacking machine raceway becomes jammed from time to time by reason of a defective tack or because some foreign body reaches the raceway and obstructs the movement of the tacks along it. When this occurs, the operator is obliged to stop the machine and remove the nozzle or a cover plate from the raceway in order to reach the source of trouble, clean the raceway and get the tacks again to run freely along it. Heretofore this operation has been objectionably time consuming and has required the use of tools to remove two or more bolts or screws with the additional danger of misplacing loose parts during the operation.

The raceway of my invention includes an easily operated clamping device for holding a cover plate in operative position and being so constructed and arranged that it may be rapidly loosened and disengaged by the operator in a single movement, thus permitting the removal of the cover plate and immediate access to the raceway.

In its preferred form the clamping device includes engaging members which contact with the body of the raceway and the cover plate and which may be subjected to clamping pressure by limited movement of a controlling member. Thus the clamping device may be slipped off the end of the raceway when released and as easily replaced when the raceway has been cleaned out. Such a device is not only a great convenience to the operator, but it is very effective in reducing lost time when it becomes necessary to clean out the raceway, and it also obviates the danger of the loss of small parts such as bolts or screws.

A feature of my novel construction is that the clamping device straddles the end of the raceway so that when loosened it may be slipped off the end of the raceway and the plate thus disengaged by a single movement.

These and other features of the invention will be best understood and appreciated from the following description of a preferred embodiment thereof, selected for purposes of illustration and shown in the accompanying drawings in which:

Fig. 1 is a fragmentary view in side elevation of a tacking machine equipped with the construction of my invention, Fig. 2 is a sectional view on the line 2—2 of Fig. 1, Fig. 3 is a fragmentary plan view showing a modified form of clamping device, and Fig. 4 is a fragmentary view in side elevation of the device shown in Fig. 3.

For illustrative purposes the invention is shown as embodied in an insole tacking machine of the general type disclosed in U. S. Letters Patent No. 1,106,393, August 11, 1914, to which reference may be had for further details of the driving and tack separating mechanisms.

In Figs. 1 and 2 a portion of the machine frame 10 is shown which carries a driving nozzle 11 and a reciprocating power operated driver bar 12 carrying a driver 13. To the frame 10 is permanently secured a raceway 14 having a passage 15 for tacks covered by a rail 16. It will be understood that the tacks, suspended by their heads in the raceway, and moving by gravity are led one by one to the driver passage when they are separated successively by means not herein shown and driven out through the nozzle 11 by the action of the driver 13. The lower end of the tack passage 15 is closed at its outer side by a flat plate 18 accurately positioned by dowel pins 19 and 20. In effect the plate 18 closes a clean-out passage from the raceway, and when the plate is removed the operator may directly reach the row of tacks that may have become jammed near the end of the raceway and can force them and any interfering obstruction down and out of the raceway thus clearing it for a new charge of freely running tacks.

As herein shown, the plate 18 is held securely in place by a clamping device comprising a threaded stud 21 having a squared head through which projects a transverse pivot pin 22. A pair of rocking jaws 23 and 24 are mounted upon the stud 21 through the medium of the pin 22. The two jaws are curved in contour so that they may straddle the end of the raceway 14, the adjacent portion of the frame 10 and the cover plate 18, all as shown in Fig. 2. A torsion spring 25 or springs tend always to separate or expand the outer or operative ends of the jaws 23 and 24.

The threaded stud 21 carries at its outer end a fluted hand disc 26 which carries a concentric conical spreader 27. The spreader is located between the outer ends of the jaws 23 and 24 and the action of the spring 25 holds the ends of the jaws in contact with the spreader. Accordingly, when the disc 26 is turned in a clockwise direction the spreader is advanced and the outer ends of the jaws positively contracted and moved into clamping engagement with the cover plate 18, the latter being otherwise free for removal.

It will be seen that in cleaning out the raceway the operator has merely to grasp the disc 26, rotate it less than one turn in counter-clockwise direction and slip the clamping device off the end of the raceway. Thereupon the cover plate may be removed, the raceway cleaned out, the cover plate returned to normal position and the clamp replaced, all in a matter of seconds and all without danger of misplacing small loose parts. Under prior conditions the operation of cleaning out the raceway always required at least ten minutes and often a much longer time in that it usually required the services of a machinist since the removal of the cover plate was a matter beyond the scope of the usual operator employed for insole tacking.

The clamping device is organized in Fig. 1 to facilitate the presentation of the work to be operated upon from the side of the machine. For certain classes of work it has been found convenient to present the work from the front of the machine and under such conditions it is desirable to locate the hand disc for the clamping device in a different position from that shown in Figs. 1 and 2. Accordingly, in Figs. 3 and 4 is disclosed a modified construction in which the hand disc is located at the rear side of the machine. In this form it comprises a threaded pin 31 carrying jaws 32 and 33 shaped to engage the raceway in the same manner as already explained. The pin 31 passes freely through the jaw 33 and is threaded into the outer jaw 32. A compression spring 34 encircling the pin 31 tends always to separate the jaws. Each jaw has a hub with a flat surface which may be engaged against the end of the raceway and adjoining parts so that the jaws are properly aligned when presented to the raceway. The jaws are contracted or released by turning the disc 35 in the appropriate direction.

Having thus disclosed my invention and described in detail illustrative embodiments thereof, I claim as new and desire to secure by Letters Patent:

1. In a tacking machine having a tacking nozzle, an improved raceway comprising a body portion presenting an inclined surface for supporting a line of tacks by their heads and delivering them to the tacking nozzle and having a side opening adjacent to its delivery end, a removable cover plate normally closing said opening, and a clamp having relatively movable jaws shaped to fit over the end of the raceway and to hold the cover plate in operative position, said jaws being separable whereby the clamp may be slipped endwise from the raceway to release the cover plate.

2. An improved raceway for fastener setting machines, comprising a body portion presenting a slot for the passage of fasteners to driving position and a clean-out opening in one side, a cover plate closing said opening, and a clamping device having separable jaws shaped to embrace the end of the raceway, one of said jaws engaging the closing plate only at its outer face and the device being removable as a whole when the jaws are released from pressure.

3. An improved raceway for a tacker, comprising a raceway having an inclined tack passage and a communicating clean-out opening near its lower end, a detachable plate closing said opening, and a clamping device having separable jaws shaped to straddle the end of the raceway and bear upon the outer face of said plate together with an operating disk and threaded connections for operating its jaws.

VERNE L. KNEELAND.

REFERENCES CITED

The following references are of record in the file of this patent:

UNITED STATES PATENTS

| Number | Name | Date |
|---|---|---|
| 111,618 | Devlin | Feb. 7, 1871 |
| 166,553 | Pollard | Aug. 10, 1875 |
| 2,240,516 | Paxton | May 6, 1941 |
| 2,416,228 | Sheppard | Feb. 18, 1947 |

FOREIGN PATENTS

| Number | Country | Date |
|---|---|---|
| 444,735 | Great Britain | Mar. 25, 1936 |